(12) United States Patent
Martin et al.

(10) Patent No.: US 9,702,255 B2
(45) Date of Patent: Jul. 11, 2017

(54) PROPELLER WITH LIGHTENING STRIKE PROTECTION

(71) Applicant: Textron Innovations, Inc., Providence, RI (US)

(72) Inventors: Billy M. Martin, Derby, KS (US); Kevin A. Davis, Andover, KS (US)

(73) Assignee: Textron Innovations, Inc., Providence, RI (US)

( * ) Notice: Subject to any disclaimer, the term of this patent is extended or adjusted under 35 U.S.C. 154(b) by 712 days.

(21) Appl. No.: 14/091,288

(22) Filed: Nov. 26, 2013

(65) Prior Publication Data

US 2015/0147183 A1    May 28, 2015

(51) Int. Cl.
*B64C 11/20* (2006.01)
*F01D 5/14* (2006.01)
*B64C 11/26* (2006.01)
*B64D 45/02* (2006.01)

(52) U.S. Cl.
CPC .............. *F01D 5/147* (2013.01); *B64C 11/26* (2013.01); *B64D 45/02* (2013.01); *Y10T 29/49332* (2015.01)

(58) Field of Classification Search
CPC .......... B64D 45/02; B64C 11/26; F03D 80/30
See application file for complete search history.

(56) References Cited

U.S. PATENT DOCUMENTS

| | | | | |
|---|---|---|---|---|
| 3,923,421 A | * | 12/1975 | Carter | B64C 27/006 244/1 A |
| 4,944,655 A | * | 7/1990 | Merz | B64C 11/26 416/146 R |
| 5,269,658 A | * | 12/1993 | Carlson | B64C 11/26 29/889.71 |
| 5,479,060 A | | 12/1995 | Giamati et al. | |
| 5,499,782 A | * | 3/1996 | Domine | B64D 45/02 244/1 A |
| 5,542,820 A | | 8/1996 | Eaton et al. | |
| 5,634,800 A | | 6/1997 | Giamati | |
| 5,767,605 A | | 6/1998 | Giamati | |
| 5,863,181 A | * | 1/1999 | Bost | B64C 11/205 416/224 |
| 7,561,402 B2 | * | 7/2009 | Heeter | H01T 4/08 361/212 |
| 7,637,792 B1 | * | 12/2009 | Davis | B63H 23/34 416/134 R |
| 8,137,074 B2 | * | 3/2012 | Mendez Hernandez | F03D 1/0675 416/224 |

(Continued)

OTHER PUBLICATIONS

PCT Patent Application PCT/US2014/067623 International Search Report and Written Opinion dated Mar. 16, 2015, 17 pages.

*Primary Examiner* — Gregory Anderson
*Assistant Examiner* — Jason Fountain
(74) *Attorney, Agent, or Firm* — Erise IP, P.A.

(57) ABSTRACT

A propeller blade assembly including a propeller blade having a leading edge, and a trailing edge extending between a tip and a hub, and an electrically conductive band extending longitudinally on either or both of the leading edge and trailing edge. The electrically conductive band secured to the leading edge of the propeller serves as an entry point on the aircraft and conductive channel into the airframe thereby avoiding the potentially damaging effect of the lightening on the carbon fiber composite propeller.

15 Claims, 3 Drawing Sheets

(56) References Cited

U.S. PATENT DOCUMENTS

| | | | |
|---|---|---|---|
| 8,342,805 B2* | 1/2013 | Mendez Hernandez | ................... F01D 11/00 244/1 A |
| 8,834,117 B2* | 9/2014 | Yarbrough | .......... F03D 11/0033 416/146 R |
| 2006/0280613 A1 | 12/2006 | Hansen | |
| 2011/0305573 A1 | 12/2011 | Olsen | |
| 2012/0003094 A1 | 1/2012 | Hansen | |
| 2012/0141277 A1 | 6/2012 | Yarbrough et al. | |
| 2012/0243997 A1 | 9/2012 | Olsen | |
| 2012/0257972 A1 | 10/2012 | Claveria Canal et al. | |
| 2012/0282097 A1 | 11/2012 | Lewke et al. | |
| 2012/0301300 A1 | 11/2012 | Muto | |

\* cited by examiner

PROPELLER WITH LIGHTENING STRIKE PROTECTION

FIELD OF THE INVENTION

The technology disclosed herein relates to an apparatus and system for a guard band for protecting aircraft composite propellers against damage from lightning strikes.

BACKGROUND

This present invention generally relates to a propeller blade constructed from a fiber-reinforced material, and more particularly to an arrangement for protecting the structural integrity of a plastic propeller blade against damage from lightning strikes. Propeller blades are among aircraft components most frequently struck by lightning. Carbon fiber-reinforced plastic materials are especially sensitive to lightning damage due to their partial electrical conductivity because the fiber is conductive while the plastic matrix is insulating. Carbon fiber blades are also more conductive than Kevlar blades and are therefore harder to protect. Typically, this protection is provided by a surface film of lightning strike protective material (e.g., cooper or aluminum) which is laid on the outer surface of the composite blade. This type of construction; however, adds complexity and weight to the propeller design. Moreover, with conductive materials, such as with Carbon fiber, the desired blade protection is difficult to achieve due to the possibility of "puncture" of the protective surface into the carbon material. This puncture allows current flow into the carbon material which will result in damage to the blade. This is the primary reason for the high dielectric glass that covers the carbon fiber material in this type of protection scheme and if it is not strong enough, then the voltage created by the spark gap will break down the dielectric and arc to the carbon fiber, causing damage to the blade. This protection scheme is also very susceptible to manufacturing issues and therefore the reliability of the design is very suspect.

Therefore, it is an object of the present invention to provide a propeller blade constructed from a composite material with lightning protection that does not require lightning protection material incorporated into the material lay-up itself.

For the foregoing reasons, there is a need for a propeller system capable of being fabricated into a configuration that will provide high performance aerodynamic characteristics with lightweight, high structural integrity and lightening protection in a single package.

SUMMARY

The effects of lightning on aircraft skins, both metallic and composite include: 1) melting or burning at lightning attachment points; 2) resistive temperature rise; 3) magnetic force effects; 4) acoustic shock effects; 5) arcing and sparking at bonds, hinges and joints; and 6) ignition of vapors within fuel tanks.

Not all materials will suffer these effects equally. Aluminum skins will suffer from melting from long duration dwell times at lightning attachment points. While they will be subject, like composites, to acoustic shock damage, their greater ductility and malleability will likely enable them to survive. Composites will suffer the most rapid rise in temperature and acoustic shock waves. Carbon composites are conductors, albeit resistive conductors and they are therefore subject to the same influences as metal structures, although in different degree. They are, for example, subject to magnetic forces, as well as arcing and sparking at bonds and resistive heating. Non-conductive composites, such as fiberglass and aramid fiber reinforced plastics will be subject to dielectric breakdown, surface flashover and puncture.

Aircraft structures include the outer skins of the aircraft, together with internal framework, such as spars, ribs, frames, and bulkheads. Lightning currents must flow between lightning entry and exit points on an aircraft and tend to spread out as they flow between attachment points, using the entire airframe as a conductor. Any conductive material, metal or conductive composite with which most of these structures are fabricated becomes part of the conductive path for lightning currents.

In metal structures, the current density at any single point in the airframes is sometimes sufficient to cause physical damage between lightning entry and exit points. Only if there is a poor electrical bond (contact) between structural elements in the current flow is there likely to be physical damage. On the other hand, where the currents converge to the immediate vicinity of an entry or exit point, there may be sufficient concentration of magnetic force and resistive heating to cause damage.

As previously noted, composites reinforced with carbon or boron fibers have some electrical conductivity, because of this, their behavior with respect to lightning differs not only from nonconductive materials, but from that of aluminum (which is much more conductive). In carbon and other conductive composites, resistive heating has an entirely different effect. As temperatures rise, the resin bonding the carbon fibers begin to break down, typically as a result of burning or pyrolysis. If the gases which the burning resins give off are trapped in a substrate, explosive release may occur with attendant damage to the structure.

The principal risk to a rotating propeller struck by lightning is structural failure, and particularly of a component undergoing considerable centrifugal forces. If the punctured skin is comprised of unidirectional cloth plies, the ply laminates may allow damage to propagate further, at least on the surface ply. Many factors influence damage. Unlike most aluminum alloys, which are ductile and will deform, but not break, carbon fiber composite materials are stiff and may shatter. Consequently, the hazards associated with a lightning strike upon a rotating composite propeller are significant and not to be readily dismissed.

There are several trends in small aircraft operations which may cause greater exposure of aircraft everywhere to lightning strikes in the future, including: 1) longer range capabilities of small airplanes; 2) increases in the number of small aircraft and rotorcraft equipped for instrument flight rules (IFR) flight; and 3) increasing the use of radar and direct route navigation aids in general aviation aircraft, permitting IFR flight under adverse weather conditions. It is these factors that warrant continued diligence in the design and operation of aircraft with respect to the hazards lightning may present.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
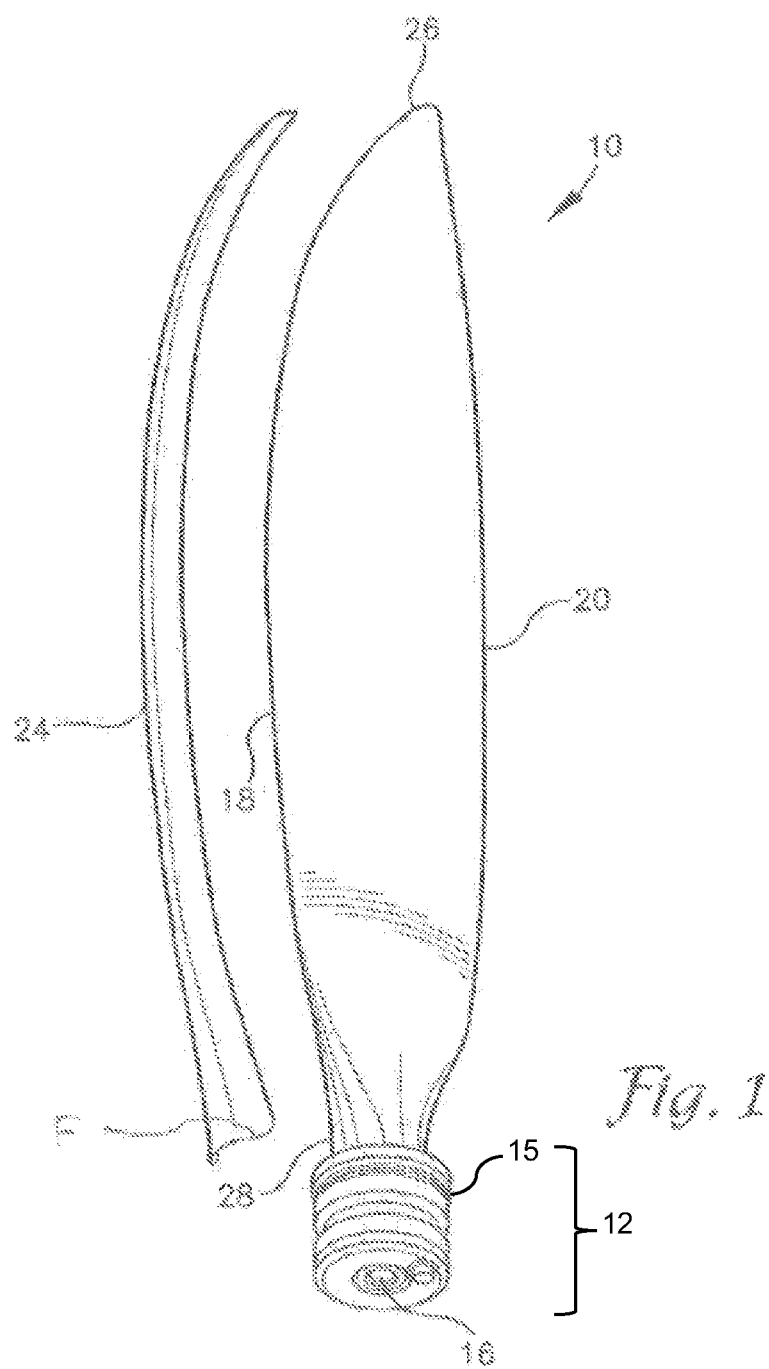
FIG. 1 is a perspective view of an embodiment of a propeller blade with an embodiment of an electrically conductive leading edge guard shown offset from the blade.

While FIG. 1 illustrates an embodiment of a composite aircraft propeller blade 10 and how the blade is supported for rotation by a propeller collar 12. Each collar 12 has a snap ring receiving groove 15 and an inner cylindrical bore 16. As those skilled in the art will recognize, blade 10 is the type having a collar 12 which inserts into a metallic hub of the propeller configured for retaining a set of variable pitch blades and mounting to an engine/crank shaft. The propeller blade 10 has a leading edge 18, and a trailing edge 20 extending between a tip 26 and a shank 28. Proximate the blade in FIG. 1 is an electrically conductive band 24 that can extend longitudinally on either or both of the leading edge and trailing edge but in FIG. 1 resides over the leading edge 18.

Figure 2:
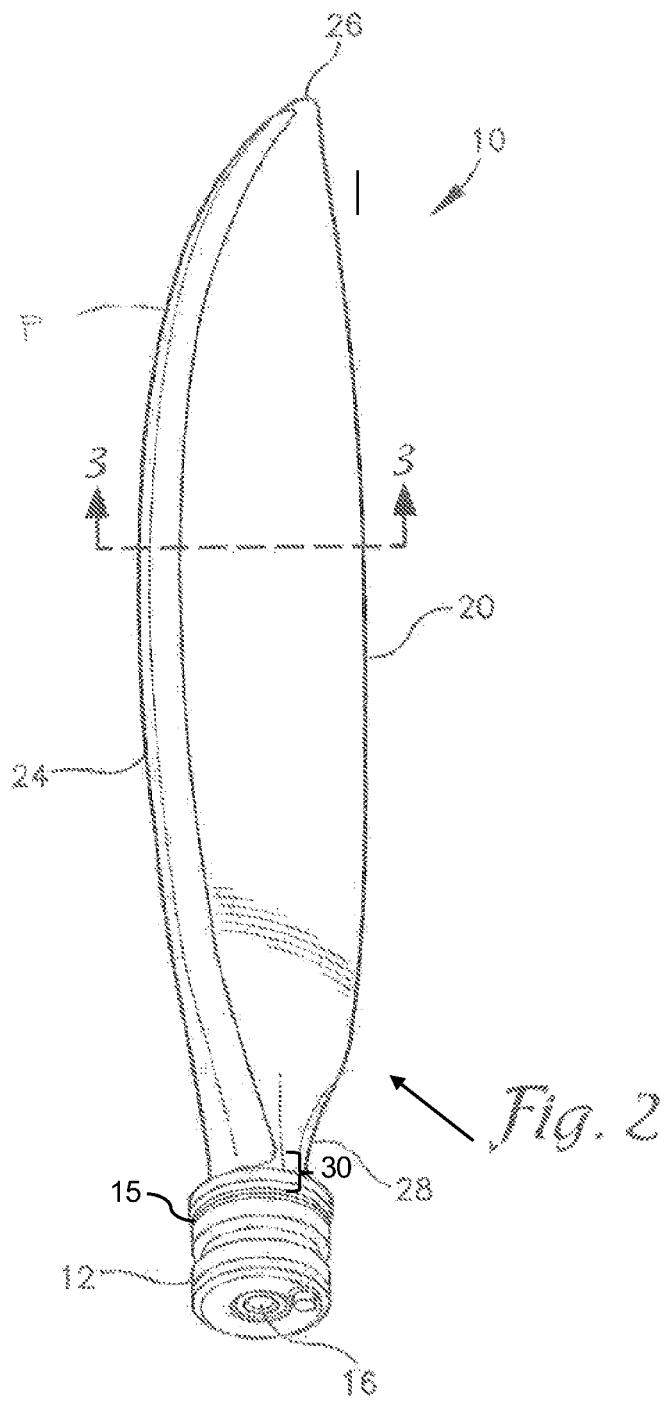
FIG. 2 is a perspective view an embodiment of a propeller blade with an electrically conductive band secured to the leading edge of the blade.

FIG. 2 depicts the electrically conductive band 24 held in position on the blade 10. The band 24 is preferably held in position using a special waterproof, weather resistant and insulating adhesive, such as Hysol® EA 9359.3 (made by Henkel). The conductive band 24 is preferably fabricated from a nickel alloy with a preferred nickel content of no less than 98.5% and a thickness of no greater than 0.033 inches and preferably extends in the range of from 0.80 to 1.25 inches on each side of the leading edge with the preferred span at 1.02 inches on each side of the leading edge as shown at "P" in FIG. 3. The band will be at its greatest thickness at the crown and taper to a lesser thickness at the flared edges.

As fabricated, and as best seen on FIG. 1, the conductive band 24 is flared at the shank (root) 28 of the blade. Importantly, the flared end "F" of the conductive band 24, when installed, does not come into contact with a snap ring assembly (not shown) located in the snap ring receiving groove 15. A gap 30 between the flared end of the band and the snap ring receiving groove 15 in the range of from 0.70 to 0.80 inches is preferred. The flared end of the conductive band preferably spans a greater width than the remainder of the band. The flaring of the band allows the electrical current a greater length of conductive material from which to arc to the snap ring assembly adjacent to collar 12.

The expanded length of the flared shank end of the blade reduces the prospect of an excessively powerful charge exiting the conductive band at a discrete point and possibly vaporizing the exit point of the electrical arc on the conductive band. This discrete type of electrical arcing could lead to damage to the blade, the band and the hub if not properly controlled.

Figure 3:
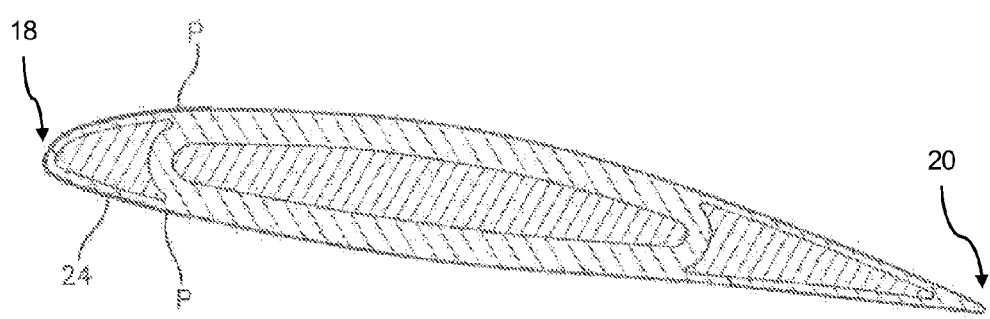
FIG. 3 is a cross section of an embodiment of the propeller blade taken along line 3-3 in FIG. 2 and depicting the electrically conductive band secured to the blade.

FIG. 3 is a cross sectional view of the blade 10 taken along line 3-3 in FIG. 2. FIG. 3 reveals the interior structure of the blade and details the placement of the band 26 over the leading edge 18 of the blade. The band 26 is preferably symmetrically positioned over the leading edge with an equal portion of the band descending over each side.

The composite propeller is fabricated in accordance with standard industry practice well known by those skilled in the art. Multiple layers, or plies, are built up to produce the desired configuration of the propeller. The final layer of the blade 10 (not shown in the Figures) is a non-conductive glass that effectively insulates the blade from the conductive band 24. The propeller system is compliant with the lightning strike provisions of the Federal Aviation Administration policy No. ANE-2001-35.31-R0 titled Policy for Bird Strike, Lightning, and Centrifugal Load Testing for Composite Propeller Blades and Spinners.

A lightning strike is essentially a high amplitude direct-current pulse with a well-defined waveform. A lightning flash initially attaches to, or enters, an aircraft at one spot and exits from another. Usually these entry and exit points are extremities of the aircraft such as the nose, wing and empennage tips, propellers and rotor blade, engine nacelles and other significant projections.

Aircraft propellers are frequent targets for lightning strikes thereby precipitating the need for the technology disclosed herein. The general location of propellers, front for traction or rear for pusher account for their high probability of lightning strike attachment. As the lightning attaches to the propeller blade at some point between the tip 26 and the shank 28 of the conductive band 24. The electrical charge will pass to the metallic hub and then conduct through the gears and bearings supporting the propeller or rotor shaft. The electrical current then travels through the bearings, which are supported on insulating lubricant films. Finally, the electrical charge travels through the airframe and exits to ground, typically at some aft or lower location on the aircraft. Thus, the electrical charge follows a ground path that includes a path through the propeller hub.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

We claim:

1. A propeller blade assembly, comprising:
   a propeller blade having a leading edge, and a trailing edge extending between a tip and a shank, wherein the blade is comprised of multiple layers of composite materials and an outermost layer is fabricated from non-conductive glass;
   a collar for mechanically coupling the shank of the blade to a metallic hub of an aircraft; and
   an electrically conductive band comprised of metal extending longitudinally on either or both of the leading edge and trailing edge and having a flared end adjacent to the collar, such that a gap exists between the flared end of the band and the metallic hub for lightning to arc therebetween.

2. The propeller blade of claim 1, wherein the conductive band is applied to the leading edge of the propeller blade.

3. The propeller blade of claim 1, wherein the blade is devoid of conductive lightning strike protective material on an outer surface of the blade.

4. The propeller blade of claim 1, wherein the conductive band is applied to the trailing edge of the propeller blade.

5. A propeller system for an aircraft capable of conducting the electrical current from a lightning strike from the propeller to an aircraft airframe, the propeller system comprising:
- a carbon-fiber composite propeller blade with a non-conductive fiberglass outer layer having a leading edge, and a trailing edge extending between a tip and a shank;
- an electrically conductive band extending longitudinally on the leading edge substantially from the tip to the shank; and
- a metallic hub for housing the propeller blade, the hub being electrically coupled to the aircraft airframe and configured to form a gap between the shank end of the electrically conductive band and the hub such that lightning may arc across the gap from the band to the hub.

6. The propeller system of claim 5, wherein the propeller is fabricated from layers of cloth ply.

7. The propeller system of claim 5, wherein the electrically conductive band is secured in position over the outer layer of non-conductive glass.

8. The propeller system of claim 5, wherein the electrically conductive band is secured to the outer layer of non-conductive glass with an adhesive.

9. The propeller system of claim 8, wherein the adhesive is a waterproof, weather resistant and insulating adhesive.

10. The propeller blade of claim 5, wherein the blade is substantially devoid of conductive lightning strike protective material on an outer surface of the blade.

11. The propeller system of claim 5, wherein a portion of the electrically conductive band at the shank end is flared away from the leading edge.

12. A method for limiting damage to an aircraft's composite propeller from a lightning strike, the method comprising:
- fabricating a composite propeller blade having a leading edge extending between a tip and a shank;
- coating the composite propeller with a non-conductive glass;
- securing an electrically conductive band extending longitudinally on either or both of the leading edge and trailing edge, wherein the band extends from the tip of the blade into the shank;
- leaving a gap between a flared end of the conductive band and the shank; and
- allowing the electrical current to arc from the conductive band to a ground path, wherein the ground path includes a path through a propeller hub.

13. The method of claim 12, wherein the gap between the flared end of the band and a snap ring receiving groove is in the range of from 0.70 to 0.80 inches.

14. A propeller system for an aircraft capable of conducting an electrical current from a lightning strike from the propeller to an aircraft airframe, the propeller system comprising:
- a propeller blade having a leading edge extending between a tip and a shank;
- an electrically conductive band extending longitudinally on either or both of the leading edge and trailing edge wherein the electrically conductive band:
  (a) is comprised of a nickel alloy;
  (b) extends in approximately equal proportion on each side of the leading edge of the propeller blade;
  (c) is flared in proximity to the propeller shank;
  (d) is of a thickness of no greater than 0.033 inches;
  (e) at an edge proximate the propeller shank is adjacent to a hub for retaining the propeller blade that is electrically coupled to the aircraft airframe; and
  (f) when the propeller is struck by lightning, electricity is conducted to the flared end of the band and is provided a path to ground.

15. The method of claim 14, wherein the ground path includes a path through the propeller hub.

* * * * *